United States Patent [19]

Feuvrier et al.

[11] Patent Number: 4,940,386
[45] Date of Patent: Jul. 10, 1990

[54] MULTIPLE FLOW TURBOJET ENGINE WITH AN OUTER RING OF THE FAN OUTLET SHRUNK ONTO THE CASE

[75] Inventors: Thierry Feuvrier, Noisy-le-Roi; Alexandre Forestier, Vaux le Penil, both of France

[73] Assignee: Societe Nationale d'Etude et de Construction de Moteurs d'Aviation "S.N.E.C.M.A.", Paris, France

[21] Appl. No.: 152,337

[22] Filed: Feb. 4, 1988

[30] Foreign Application Priority Data

Feb. 5, 1987 [FR] France ................ 87 01394

[51] Int. Cl.⁵ .................................... F04D 29/54
[52] U.S. Cl. ......................... 415/209.2; 415/189; 415/209.3
[58] Field of Search ............ 415/189, 190, 209.2, 415/209.3, 209.4, 210.1

[56] References Cited

U.S. PATENT DOCUMENTS

| | | | |
|---|---|---|---|
| 2,914,300 | 11/1959 | Sayre | 415/217.1 |
| 3,442,442 | 5/1969 | Seiwert | 415/217.1 |
| 3,708,242 | 1/1973 | Bruneau et al. | 415/209.4 |
| 3,849,023 | 11/1974 | Klompas | 415/209.4 |
| 3,867,066 | 2/1975 | Canova et al. | 415/209.3 |
| 4,305,696 | 12/1981 | Pask | 415/209.2 |
| 4,820,120 | 4/1989 | Feuvrier et al. | 415/189 |

FOREIGN PATENT DOCUMENTS

| | | |
|---|---|---|
| 0017306 | 10/1980 | European Pat. Off. . |
| 969599 | 6/1958 | Fed. Rep. of Germany ... 415/209.4 |
| 2246185 | 4/1975 | France . |
| 2321616 | 3/1977 | France . |
| 991357 | 5/1965 | United Kingdom . |
| 2115883 | 9/1983 | United Kingdom . |

Primary Examiner—Robert E. Garrett
Assistant Examiner—John T. Kwon
Attorney, Agent, or Firm—Oblon, Spivak, McClelland, Maier & Neustadt

[57] ABSTRACT

The cartridge of a fan outlet for a multiple flow turbojet engine is made of composite material and includes two thick lateral strips (8a, 8b) positioned in the interior of the outer case and a narrow central band pierced with slots (10) in which guide vanes (5), provided with an in-molded cover, come to be fixed. The outer cartridge can be integral with the support of soundproofing panels (7 and 9) and support the abradable part (6) facing fan (3).

5 Claims, 4 Drawing Sheets

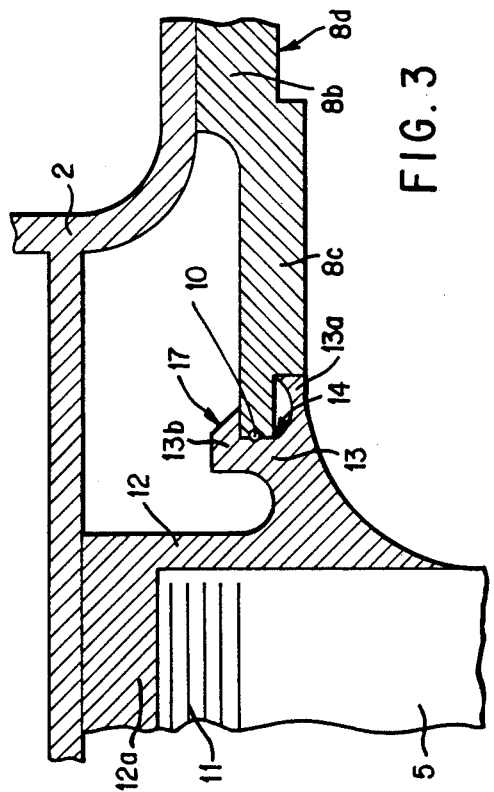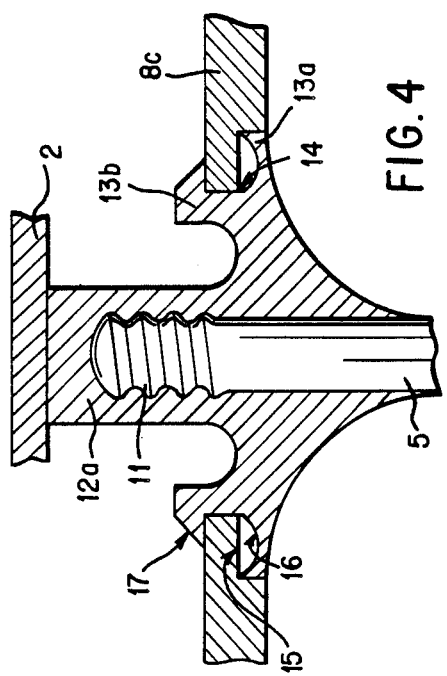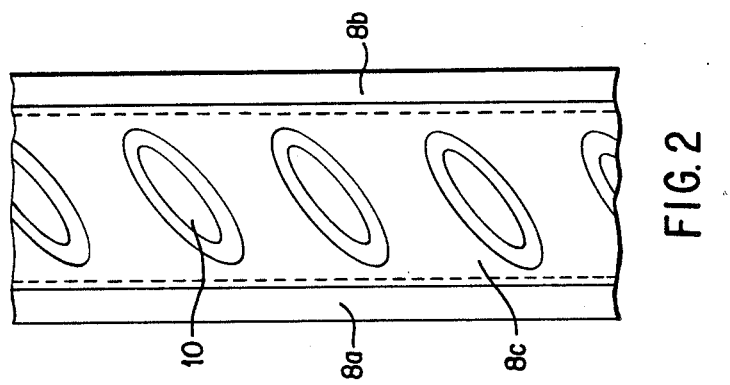

MULTIPLE FLOW TURBOJET ENGINE WITH AN OUTER RING OF THE FAN OUTLET SHRUNK ONTO THE CASE

BACKGROUND OF THE INVENTION

1. Field of the Invention

The present invention relates to the production of outer cases for fan flow of multiple flow turbojet engines and more specifically to the integration of an outer ring of the fan outlet on such a case and the means of attaching the guide vanes of the fan outlet to the outer ring.

2. Discussion of the Background

French patent No. FR 2 321 616 in the name of the applicant shows an example of an embodiment of a fan outlet in which each guide vane has a cruciform head screwed onto the case, the fastening screw keeping in position a seal which is supported on the edges of soundproofing panels located upstream and downstream from the fan outlet to restore the exterior boundary wall of the fan flow.

Such a construction has the drawback of requiring two fastening screws for each fan outlet guide vane and fastening screws of the soundproofing panels, which accordingly increases the assembly time and increases the production cost since the number of parts needed for mounting is significant.

On the other hand, compressor stator blades are known from patent No. FR 2 246 185 whose smooth guide vanes are set at the head in a case ring, compressible packings made of metallic braided wires being compressed between the case ring and an outer case screwed on to perform a vibration damping function.

This kind of device described is not very well suited to the production of a fan outlet stage for a multiple flow turbojet engine because it does not permit, or hardly permits, individual disassembly of the fan outlet guide vanes when there is a particular, significant requirement for the maintenance of this part of the engine which is the most subject to impacts from the intake of foreign objects such as hailstones, birds . . .

SUMMARY OF THE INVENTION

The object of the present invention is to simplify the production of outer case rings for fan flow of multiple flow turbojet engines by simplifying the assembly of the parts that make up the inner edge of the fan flow and by decreasing the number of parts it comprises.

It generally aims at making possible the use of guide vanes that are smooth, extruded or forged or made of composite material in fan outlets thus embodied, while providing a simple assembly that guarantees good resistance of the guide vanes to vibrations and the individual disassembly of such guide vanes.

Finally, it aims to simplify the production of the soundproofing or the abradable parts located along the airflow.

The object of the invention therefore is a multiple flow turbojet engine with a fan outlet of the type comprising a stage of fixed guide vanes without a platform placed at regular intervals between an inner ring and an outer ring so that the outer ring consists of a single-piece annular cartridge made of composite material comprising, on the one hand, two solid and thick lateral bands whose outer surface is shrunk onto the interior of the cold flow case of the turbojet engine and whose inner surface comprises two lateral spot facings for supporting the edges of the soundproofing panels placed upstream and downstream from the said cartridge and comprising, on the other hand, between the two thick lateral strips, a narrowed central part which connects them and which is pierced by attachment slots for the fan outlet guide vanes.

In conjunction with these slots, the radially outer end of the blade of each guide vane of the fan outlet has on top an elastomer in-molded cover on striations of said end, said cover comprising a widened outer edge having a groove that demarcates two lips, one outer lip which comes to be hooked onto the outer face of the slot of the narrowed central part of the cartridge and the other internal lip, which comes to be housed in a spot facing surrounding the slot on the radially inner face of the cartridge.

Other characteristics of the invention will be explained below, as well as the method of mounting the fan outlet guide vanes, with reference to the attached drawings, of which FIG. 1 shows in axial, longitudinal half section a low-pressure compressor of a multiple flow turbojet engine incorporating the invention;

FIG. 2 shows, in a view developed along II—II of FIG. 1, the shrunk-on cartridge carrying the guide vanes;

FIG. 3 shows detail A of FIG. 1 along the longitudinal face of a guide vane;

FIG. 4 shows the same detail along the thickness of the guide vane;

DESCRIPTION OF THE PREFERRED EMBODIMENTS

Figure 1:
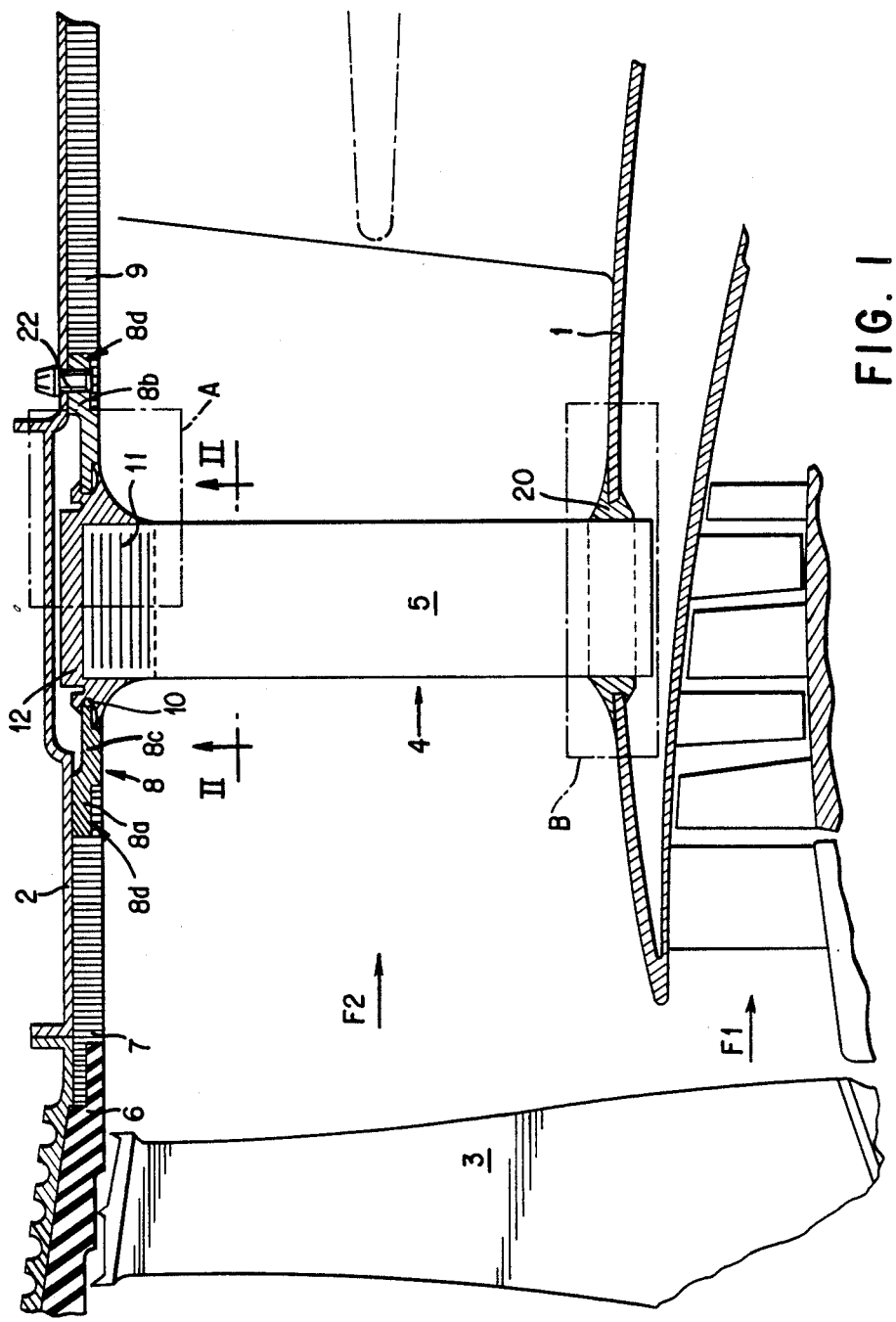

In FIG. 1 an axial half section of the intake of the compressor of a multiple flow turbojet engine has been shown. The air enters the engine and is divided into a core engine flow F1 entering the low-pressure compressor and a flow F2 passing in a by-pass duct surrounding the low-pressure compressor. The fan flow is limited on the interior by an intermediate case 1 and an outer case 2. The fan flow is deflected by a fan rotor 3 then straightened by a fan outlet 4 formed by a grille of fixed guide vanes 5.

Outer case 2 carries successively, and in a way known in the art, upstream and downstream, an abradable annular part 6 contributing to the tightness of the end of fan rotor guide vanes 3; an annular part supporting soundproofing panels 7 intended to decrease the noise caused by the fan flow; an outer ring 8 to fasten the stator vanes 5 of fan outlet 4; then again a soundproofing cartridge 9.

If the existence of all these elements is well known in the art, it is their method of production and the combination of their respective methods of attachment to each other which comprises the obJect of the present invention, particularly concerning the attachment of the fan outlet guide vanes to the outer ring and the bonds between this outer ring and the upstream and downstream soundproofing elements which surround it.

Outer ring 8 for attaching the fan outlet guide vanes, according to the invention, consists of a single-piece annular cartridge made of composite material. Cartridge or outer ring 8 consists of two shells (an outer shell, an inner shell) containing an internal matrix.

The shells consist of glass fibers or of carbon fibers (or both) bonded by a resin.

The internal matrix consists of a honeycomb or resin support filled with hollow silica balls.

Cartridge or outer ring 8 thus formed comprises two thick annular lateral parts 8a, 8b whose outer annular surfaces are shrunk onto case 2 and which assure the rigidity of cartridge or outer ring 8. This latter comprises, between strips 8a, 8b, a narrowed central annular part 8c in which slots 10, intended for the attachment of fan outlet guide vanes 5, are punched by stamping or by any other means. Detail A of FIG. 1 represented on a larger scale in FIGS. 3 and 4 shows the method of hooking the guide vanes to cartridge or outer ring 8.

Guide vanes 5 are guide vanes called smooth in the sense that they do not have platforms either at the head or at the base and can be made of composite material with a glass fiber or Kevlar base or of a forged or extruded light metal alloy of aluminum or titanium.

The heads of the guide vanes have striations 11 on which covers 12 are in-molded and made of an elastomer material. Cover 12 comprises a widened outer edge 13 consisting of two lips 13a and 13b defining between them a circular groove 14. This groove works with slot 10 of part 8c of cartridge or outer ring 8. On the other hand, in-molded elastomer cover 12 can comprise, in the extension of guide vane 5, a part of an extra thickness 12a which, in one variant, can come into contact with the inner wall of case 2 after assembly to act as shock absorber for vibrations between guide vane and case.

Slots 10 have on their radially inner edge a spot facing 15 which goes completely around them to receive lip 13a of cover 12, the latter having an upper concave edge 16 intended to allow their deformation while they are being put in place. Further, to facilitate this, lip 13b comprises a tapered upper edge 17 intended to allow the introduction of the cover into slot 10.

Figure 6:
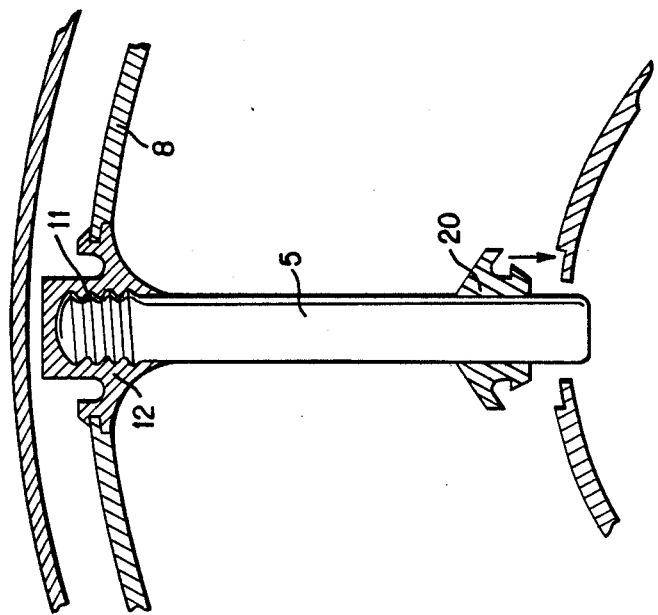
FIG. 6 shows a step in the mounting of the fan outlet guide vanes as described.
Figure 5:
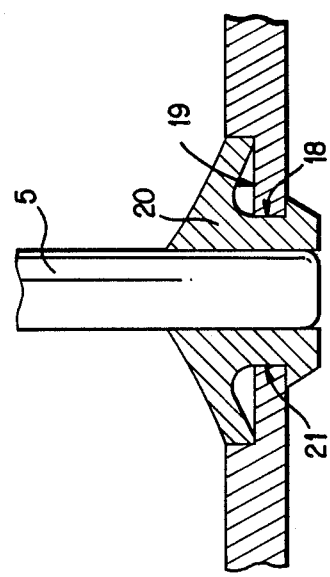
FIG. 5 shows detail B of FIG. 1 of an elastomer seal mounted at the base in the conventional way on the guide vane, seen in the direction of the thickness of the guide vane.

The mounting of the guide vane in shrunk-on cartridge or outer ring 8 is done in the following way (FIGS. 5 and 6):

The guide vane is equipped during production with its in-molded cover 12 and on the bottom part of the guide vane is a sliding elastomer seal 20 comprising a groove 18 which works with a rim hole 19 of a slot 21 of intermediate case 1.

The guide vane is slipped into slot 21 of case 1, then it is lifted into slot 10 of cartridge or outer ring 8 until, after introduction of tapered edge 17, lip —b has passed outside part 8c and lip 13a is in place in spot facing 15. Then, seal 20 is put in place by sliding it along the guide vane until it is fixed in slot 21 of case 1.

Shrunk-on cartridge or outer ring 8 comprises, on its upstream and downstream lateral edges, recesses 8d to which soundproofing panels or cartridges 7 and 9 are screwed at 22.

In that way, by screwing panels 7 and 9 directly to shrunk-on cartridge or outer ring 8, it is not necessary to provide case extra thicknesses for internal screw threads for fastening screws of the soundproofing panels, as this has been done in the past and thus the production of the outer case rings 2 is simplified.

Figure 7:
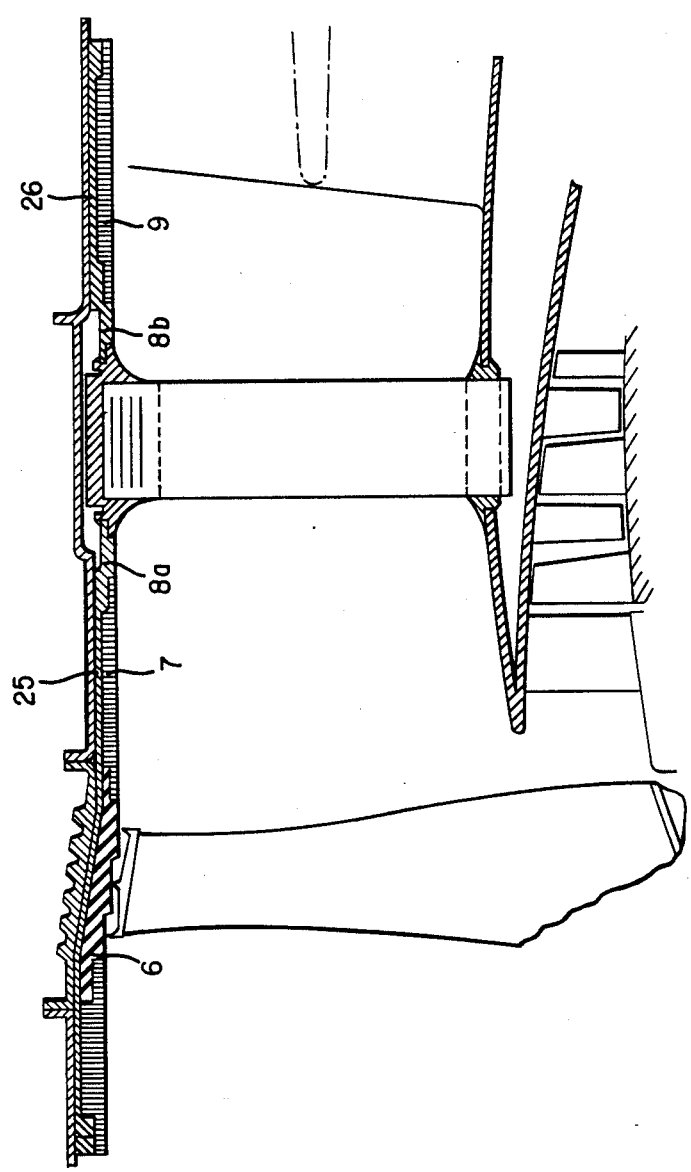
FIG. 7 shows a variant embodiment of the outer cartridge in which the shrunk-on cartridge is one piece with the supports of the soundproofing panels and of an abradable cartridge.

In a variant embodiment shown in FIG. 7, shrunk-on cartridge or outer ring 8 can comprise a single-piece upstream extension 25 and downstream extension 26 which acts as a support to abradable part 6, to guide vanes 5 of the fan outlet and to the soundproofing panels and which can constitute a unit subassembly able to be removed as one piece from case 2, which can constitute an advantage at the maintenance level since this allows a very rapid standard exchange of this subassembly, which can then be repaired if necessary in the shop without immobilizing the entire engine for a long period.

The invention is thus advantageously applied to bypass turbojets for aviation with reduced maintenance.

We claim:

1. Multiple flow turbojet engine with a fan outlet which comprises:

a stage of fixed guide vanes without platforms placed at regular intervals between an inner ring and an outer ring, wherein the outer ring comprises a single-piece, annular cartridge 8 made of composite material comprising two solid lateral strips whose outer surface is positioned within the interior of an outer case for the cold flow of the turbojet engine and whose inner surface comprises two lateral recesses for support of the edges of soundproofing panels placed upstream and downstream from said cartridge and positioned between the two lateral strips a narrowed central part that connects the two lateral strips and which has a plurality of slots for attaching guide vanes of the fan outlet and wherein a radially outer end of the blade of each guide vane of the fan outlet has a cover positioned thereon for cooperation with said slots and which is made of a molded elastomer, said cover having a widened outer edge having a groove and an outer and inner lip, said outer lip being hooked onto the outer face of a slot (10) of said narrowed central part of the cartridge and said inner lip being housed in a slot formed on a radially inner face of said cartridge.

2. Multiple flow turbojet engine according to claim 1, wherein said cover comprises, in the extension of the guide vane, a portion having an extra thickness supported on the outer case to provide an increased damping of vibrations to which the guide vane is subjected.

3. Multiple flow turbojet engine according to claim 1, wherein guide vanes are positioned in the inner ring, the groove of the cover is fixed in a slot of the outer cartridge, and a seal is fixed on the inner ring.

4. Multiple flow turbojet engine according to claim 1, wherein the upstream and downstream soundproofing panels are fixed to the shrunk-on cartridge by screws placed at the level of lateral recesses of said cartridge.

5. Multiple flow turbojet engine according to claim 1, wherein an outer cartridge of the fan outlet is integrated as a single unit into a ring which comprises a support for soundproofing rings and an abradable cartridge for providing tight mounting of the fan rotor blades.

* * * * *

UNITED STATES PATENT AND TRADEMARK OFFICE
CERTIFICATE OF CORRECTION

PATENT NO. : 4,940,386

DATED : July 10, 1990

INVENTOR(S) : THIERRY FEUVRIER, ALEXANDRE FORESTIER

It is certified that error appears in the above-identified patent and that said Letters Patent is hereby corrected as shown below:

Cover page, line 1, and column 1, lines 1-3, the title should read --MULTIPLE FLOW TURBOJET ENGINE WITH AN OUTER RING OF THE FAN OUTLET POSITIONED WITHIN A CASE--.

Column 3, line 6, change "orouter" to --or outer--.

Signed and Sealed this

Eighth Day of October, 1991

Attest:

HARRY F. MANBECK, JR.

Attesting Officer

Commissioner of Patents and Trademarks